UNITED STATES PATENT OFFICE.

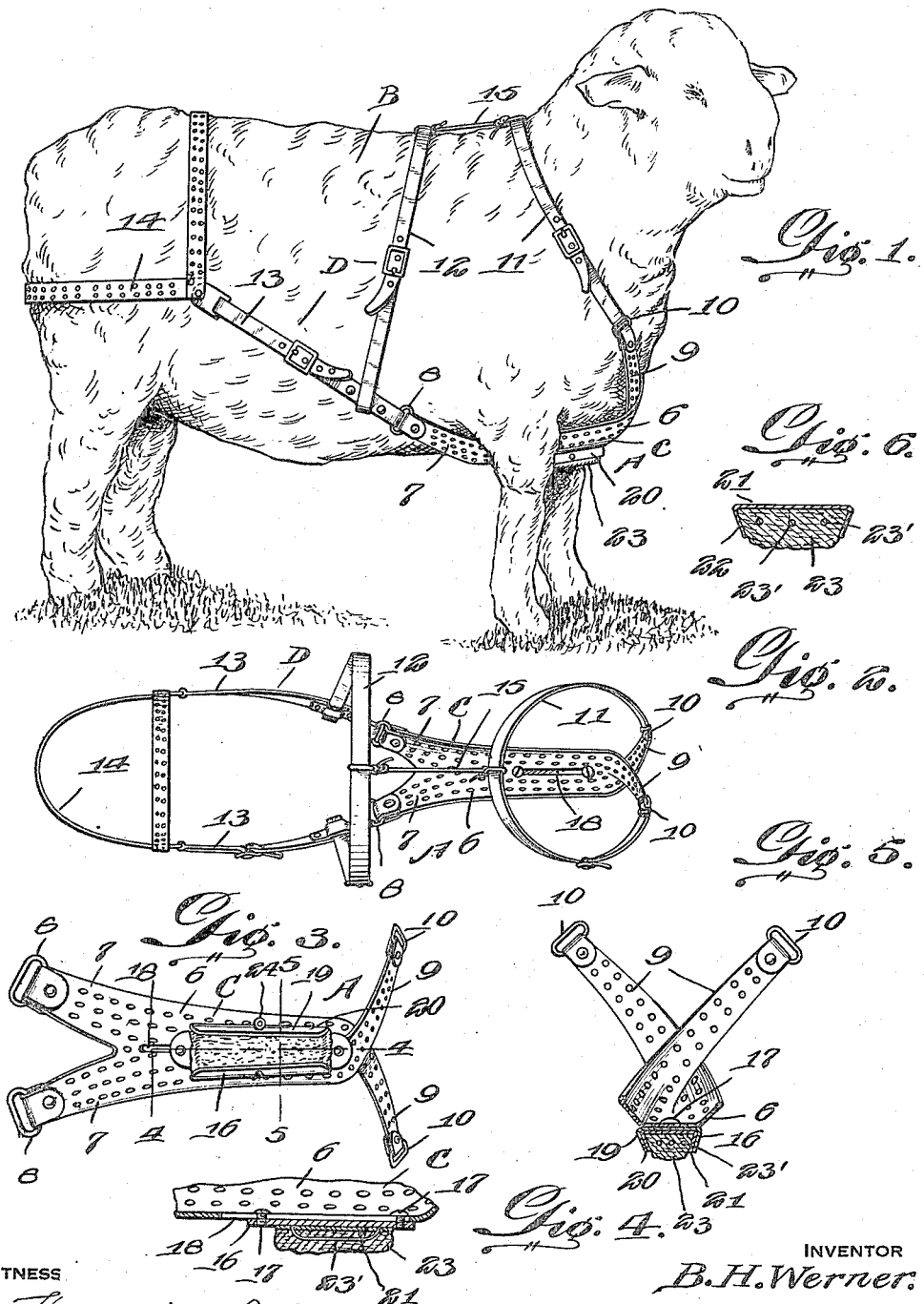

BENJAMIN H. WERNER, OF CASPER, WYOMING, ASSIGNOR TO UNIVERSAL MARKING DEVICE COMPANY, OF CASPER, WYOMING, A CORPORATION OF WYOMING.

MARKING DEVICE.

1,237,983.   Specification of Letters Patent.   Patented Aug. 21, 1917.

Application filed November 18, 1916. Serial No. 132,219.

*To all whom it may concern:*

Be it known that I, BENJAMIN H. WERNER, a citizen of the United States, residing at Casper, in the county of Natrona and State of Wyoming, have invented new and useful Improvements in Marking Devices, of which the following is a specification.

This invention relates to a marking device and more particularly to a marking device adapted to be worn by the male animals in a herd or flock, and by means of which stock breeders during the breeding season are able to determine which of the female animals in the flock or herd have been rendered pregnant.

The primary object of the invention is to provide a marking device of this character which may be applied to the male animals in a flock or herd during the breeding season, and is so constructed that when the male animal wearing the same has coition with a female in the flock or herd the female will be marked in such a manner that the stock breeder will be able to determine the particular male with which copulation took place and the time at which the period of gestation should end should the animal have been rendered pregnant.

A further object of the invention is to provide a marking device of the class described in which a breast plate to be held against the chest of an animal by a harness connected therewith is provided with a holder for marking material so constructed that after a predetermined time the marking material therein may be removed and a marking material of different color substituted therefor, so that all the animals impregnated during the period that a certain colored marking material was used may be segregated and the period of gestation ascertained by the breeder.

With these and other objects in view, the invention resides in the novel combination and arrangement of parts, which will be hereinafter described and particularly pointed out in the claims.

The preferred embodiment of the invention has been illustrated in the accompanying drawing, although no restriction is necessarily made to the precise details of construction therein shown, as changes, alterations, and modifications within the scope of the claims may be resorted to when desired.

In the drawing—

Figure 1 is a view in elevation of the improved marking device, and showing the same applied to an animal.

Fig. 2 is a top plan view of the marking device, and showing the same removed from the animal.

Fig. 3 is a bottom plan view of the breast plate included in the improved marking device, and showing the same disconnected from the harness.

Fig. 4 is a fragmentary longitudinal section on the line 4—4 of Fig. 3.

Fig. 5 is a transverse sectional view on the line 5—5 of Fig. 3.

Fig. 6 is a transverse sectional view through the holder for the marking material.

Like characters of reference denote corresponding parts throughout the several views in the drawing.

Referring now to the drawing in detail, the letter A designates the improved marking device as a whole which in this instance has been shown applied to a ram, designated in Fig. 1 in the drawing by the numeral B, it, of course, being understood that the device is merely shown applied to a ram for the sake of illustration and may be applied to any other male animal as the occasion requires, said marking device comprising a breast plate C and a harness D by means of which the breast plate may be held against the chest of an animal as shown in Fig. 1 in the drawing.

The breast plate C which is adapted to be arranged between the fore legs of an animal is provided with a tapered and perforated body 6 curved transversely throughout its length and provided at its larger end with oppositely inclined tongues 7, with each tongue having connected therewith a loop 8. The body 6 is slitted for a portion of its length to provide crossed and oppositely inclined arms 9 arranged at substantially a right-angle to the body 6 for contact with the shoulders of the animal to which the device is applied and with each arm 9 having connected with its free end a loop 10.

The harness D includes an adjustable neck band 11 adapted to be passed around the animal's neck and is terminally connected with the arms 9 by means of the loops 10, while an adjustable back strap 12 to be passed over the animal's back is terminally connected with adjustable breeching straps 13 having connection with a breeching 14 and the loops 8 of the tongues 7, said neck band and back band being connected through the medium of a strip 15.

From the above described manner of connecting the harness with the breast plate C, it will be seen that the improved marking device may be easily and quickly applied or disconnected from an animal as the occasion may require and that the harness is adjustable to permit the marking device to be used in connection with different types of animals.

A clamp 16 is adjustably mounted upon the body 6 of the breast plate C by means of binding screws 17 having their shanks passing through a slot 18 in the body 6 and received in threaded openings in the tapered body portion 19 of the clamp 16, said body portion 19 having formed integral therewith longitudinally extending and oppositely inclined resilient gripping flanges 20 between which is arranged a tapered holder 21 for marking composition, said holder being provided with resilient and oppositely inclined flanges 22 for retaining marking material within the holder and to be engaged by the gripping flanges 20 of the clamp 16.

From the foregoing description of the construction of the clamp 16 and holder 21, it will be seen that the holder 21 may be firmly wedged within the clamp 16 and in such a manner as to prevent casual displacement of the holder from within the clamp, although the holder may be easily and quickly removed from the clamp when the occasion requires to permit different colored marking materials to be used in connection with the improved marking device.

The block of marking material 23 preferably formed from a mixture of asbestos and colored chalk is secured in the holder 21 by a wire 23' threaded through the material and openings in the top of the holder. The holder 21 is locked within the clamp 16 by a fastening member 24, such as a cotter pin, or the like, which is passed through registering openings in the flanges on the clamp 16, the holder 21, and the marking material.

When the improved marking device has been applied to an animal as shown in Fig. 1 in the drawing, it will be seen that each animal coming in contact with the marking device will be marked in such a manner that the breeder may segregate the marked animal for the purpose set forth.

From the foregoing description, taken in connection with the accompanying drawing, it is at once apparent that a marking device for the purpose set forth has been provided which though simple in construction, inexpensive of manufacture, is highly efficient in use.

Having thus described the invention, what is claimed as new, is:

1. A marking device comprising a breast plate having a body portion to be arranged between the fore legs of an animal, arms at one end of said breast plate for contact with the shoulders of the animal, ears at the opposite end of said breast plate, a harness for connecting the breast plate with an animal connected with said arms and ears, and a holder for marking material adjustably mounted on said body portion.

2. A marking device comprising a breast plate having a body portion for contact with the chest of an animal, oppositely inclined and crossed arms at one end of said breast plate, a neck band having connection with said arms, spaced ears at the opposite end of said breast plate, a breeching connected with said ears, a back band having connection with said breeching and neck band, and a holder for marking material adjustably mounted on said body portion.

3. A marking device comprising a breast plate having a body portion, oppositely inclined and crossed arms at one end of said body portion, an adjustable neck band having connection with said arms, oppositely inclined ears at the other end of said body portion, a breeching, adjustable breeching straps connecting the breeching with said ears, an adjustable back strap having connection with said breeching straps and the neck band, and a holder for marking material slidably mounted on said body portion.

4. A marking device comprising a breast plate, means for connecting the breast plate with an animal, a clamp adjustably mounted on said breast plate and having oppositely inclined gripping flanges, and a holder for marking material arranged between said flanges and engaged thereby.

In testimony whereof I affix my signature.

BENJAMIN H. WERNER.